United States Patent
Liu

(10) Patent No.: US 10,161,766 B2
(45) Date of Patent: Dec. 25, 2018

(54) MAGNETIC POLE POSITION DETECTION DEVICE OF PERMANENT MAGNET-TYPE SYNCHRONOUS MOTOR

(71) Applicant: FUJI ELECTRIC CO., LTD., Kawasaki (JP)

(72) Inventor: Jiangheng Liu, Hino (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 300 days.

(21) Appl. No.: 14/935,797

(22) Filed: Nov. 9, 2015

(65) Prior Publication Data

US 2016/0061635 A1    Mar. 3, 2016

Related U.S. Application Data

(63) Continuation of application No. PCT/JP2014/061356, filed on Apr. 23, 2014.

(30) Foreign Application Priority Data

May 28, 2013   (JP) ................................. 2013-111734

(51) Int. Cl.
*G01D 5/243* (2006.01)
*H02P 21/10* (2016.01)
(Continued)

(52) U.S. Cl.
CPC ................ *G01D 5/243* (2013.01); *H02P 6/16* (2013.01); *H02P 21/10* (2013.01); *G01D 5/20* (2013.01)

(58) Field of Classification Search
CPC ........... H02P 21/10; H02P 6/16; G01D 5/243; G01D 5/20
See application file for complete search history.

(56) References Cited

U.S. PATENT DOCUMENTS 5,608,302 A * 3/1997 Umida ................ H02P 21/0003
                                                      318/723
5,656,911 A * 8/1997 Nakayama .......... H02P 21/0089
                                                      318/718
(Continued)

FOREIGN PATENT DOCUMENTS

EP    1 555 748 A2    7/2005
EP    2 688 196 A2    1/2014
(Continued)

OTHER PUBLICATIONS

Shuichi et al., "Phase Detection of Synchronous Motor", 1999, pp. 1-4.*

(Continued)

*Primary Examiner* — John Breene
*Assistant Examiner* — Eyob Hagos

(57) ABSTRACT

A magnetic pole position detection device of a permanent magnet-type synchronous motor detects, through a current draw-in operation, an amount of deviation between an origin of a magnetic pole position of a permanent magnet that makes up a rotor of a permanent magnet-type synchronous motor, and an origin of an output signal of a magnetic pole position sensor, and correcting the output signal of the magnetic pole position sensor on the basis of the amount of deviation, to thereby detect a true magnetic pole position. The detection device computes a phase current $I_a$ and computes a d-axis current from the phase current $I_a$. The current draw-in operation is performed by causing the d-axis current to flow through armature windings of the motor, to thereby draw the rotor to the magnetic flux axial direction.

6 Claims, 7 Drawing Sheets

1 : PERMANENT MAGNET-TYPE SYNCHRONOUS MOTOR
2 : MAGNETIC POLE POSITION SENSOR

(51) Int. Cl.
*H02P 6/16* (2016.01)
*G01D 5/20* (2006.01)

(56) References Cited

U.S. PATENT DOCUMENTS

| | | | | |
|---|---|---|---|---|
| 2010/0109586 A1* | 5/2010 | Matsui | ............... | B60L 11/14 318/400.04 |
| 2011/0061547 A1* | 3/2011 | Nagase | ............. | B30B 15/148 100/35 |

FOREIGN PATENT DOCUMENTS

| | | |
|---|---|---|
| JP | 11-252972 | 9/1999 |
| JP | 2001-128484 | 5/2001 |
| JP | 2011-66992 | 3/2011 |
| WO | WO 2006/075742 A1 | 7/2006 |

OTHER PUBLICATIONS

Jahns et al. "Interior Permanent-Magnet Synchronous Motors for Adjustable-Speed Drives", 1986, IEEE, pp. 739-747.*
International Search Report dated Jul. 15, 2014, in corresponding International Application No. PCT/JP2014/061356.
Extended European Search Report dated Jan. 3, 2017 in corresponding European Patent Application No. 14805076.8.

* cited by examiner

1 : PERMANENT MAGNET-TYPE SYNCHRONOUS MOTOR
2 : MAGNETIC POLE POSITION SENSOR

1 : PERMANENT MAGNET-TYPE SYNCHRONOUS MOTOR
2 : MAGNETIC POLE POSITION SENSOR
3 : INVERTER CONTROL DEVICE
3 0, 3 5, 3 6 : CURRENT REGULATOR
3 1 : SPEED REGULATOR
3 2 : CURRENT COMMAND CALCULATOR
3 3, 3 4 : SUBTRACTOR
3 7, 3 8 : COORDINATE CONVERTER
3 9 : DIFFERENTIAL CALCULATOR
4 : PWM INVERTER
4 2, 4 3 : CURRENT DETECTOR 1 0 1, 1 0 2, 1 0 3 : DRAW-IN CURRENT COMPUTING UNIT 1 0 4 : DRAW-IN CURRENT SELECTION UNIT 1 0 4 a : $I_d$ COMPUTING UNIT $I_{a1}$ : $I_a$ IN FIRST EMBODIMENT $I_{a2}$ : $I_a$ IN SECOND EMBODIMENT $I_{a3}$ : $I_a$ IN THIRD EMBODIMENT

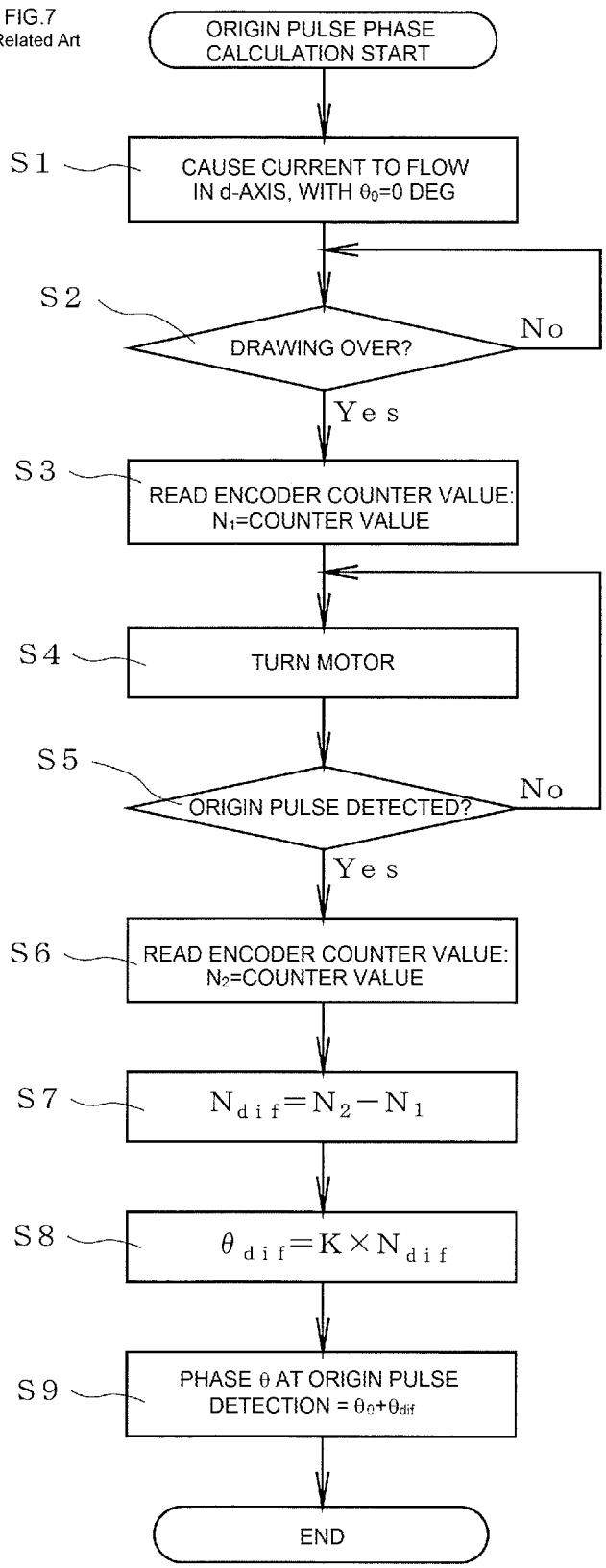

MAGNETIC POLE POSITION DETECTION DEVICE OF PERMANENT MAGNET-TYPE SYNCHRONOUS MOTOR

CROSS-REFERENCE TO RELATED APPLICATIONS

This application is a continuation application, filed under 35 U.S.C. § 111(a), of International Application PCT/JP2014/061356 filed on Apr. 23, 2014, and claims benefit of foreign priority to Japanese Patent Application 2013-111734 filed May 28, 2013, the disclosure of each of which is incorporated herein by reference.

BACKGROUND

1. Field

The present disclosure relates to a magnetic pole position detection device that, on the basis of a current draw-in scheme, detects an amount of deviation between an origin of a magnetic pole position of a permanent magnet that makes up a rotor of a permanent magnet-type synchronous motor, and an origin (reference position) of an output signal of a magnetic pole position sensor, and that detects a true magnetic pole position on the basis of the amount of deviation.

2. Related Art

FIG. 1 is a configuration diagram of a driving system in which a permanent magnet-type synchronous motor is driven by an inverter. FIG. 1 includes a permanent magnet-type synchronous motor (PMSM) 1, a magnetic pole position sensor 2, such as an encoder, attached to a rotor shaft of the synchronous motor 1, an inverter control device 3 to which a speed command value n* is inputted, and a PWM inverter 4. In this driving system, speed control and position control by the synchronous motor 1 are performed by feeding back, to the inverter control device 3, a magnetic pole position θ of the rotor (permanent magnet) of the synchronous motor 1 as detected by the magnetic pole position sensor 2, and generating a driving signal for a semiconductor switching element of the inverter 4.

FIG. 2 is a block diagram illustrating the specific configuration of the inverter control device 3 of FIG. 1, the purpose of the inverter control device 3 being herein to drive the synchronous motor 1 according to so-called vector control. In FIG. 2, a subtractor 30 works out a deviation between a speed command value n* and a speed detected value n, and a speed regulator 31 computes a torque command value Trq* such that the deviation becomes zero. A current command calculator 32 computes, on the basis of the torque command value Trq*, a d-axis current command value $I_d^*$ and a q-axis current command value $I_q^*$ being components that are mutually orthogonal in d-q rotating coordinates. As is known, the d-axis is a virtual axis of control along a magnetic flux axis of the permanent magnets that make up the rotor of the synchronous motor 1. The q-axis is an axis orthogonal to the d-axis. Furthermore, a differential calculator 39 computes the speed detected value n through differentiation of a magnetic pole position (angle) θ of the rotor.

Meanwhile, output currents $I_v$, $I_w$ of the inverter 4 are detected by current detectors 42, 43, and the detected values are inputted to a coordinate converter (three-phase/two-phase converter) 38. The coordinate converter 38 converts three-phase currents $I_u$, $I_v$, $I_w$, including the output currents $I_v$, $I_w$, to a d-axis current detected value $I_d$ and a q-axis current detected value $I_q$ of two phases, using the magnetic pole position θ. A current regulator 35 operates to generate a d-axis voltage command value $V_d^*$ such that the deviation between the d-axis current command value $I_d^*$ and the d-axis current detected value $I_d$ worked out by the subtractor 33, becomes zero. A current regulator 36 operates to generate a q-axis voltage command value $V_q^*$ such that the deviation between the q-axis current command value $I_q^*$ and the q-axis current detected value $I_q$, worked out by the subtractor 34, becomes zero.

A coordinate converter (two-phase/three-phase converter) 37 converts the d-axis voltage command value $V_d^*$ and the q-axis voltage command value $V_q^*$ to three-phase voltage command values $V_u^*$, $V_v^*$, $V_w^*$, using the magnetic pole position θ. Through an on-off operation of an internal semiconductor switching element, the PWM inverter 4 outputs a three-phase AC voltage corresponding to the voltage command values $V_u^*$, $V_v^*$, $V_w^*$, to drive thereby the synchronous motor 1.

In the above configuration, absolute position information on the rotor of the synchronous motor 1 is obtained at the coordinate converters 37, 38 on the basis of the magnetic pole position θ as detected by the magnetic pole position sensor 2. However, it is difficult to accurately match the origin of the magnetic pole position of the rotor and the origin of the output signal of the magnetic pole position sensor 2, due to requirements in terms of simplifying to some extent the assembly operation of the motor, and also due to precision and cost constraints. Therefore, the amount of deviation between the origin of the magnetic pole position and the origin of the output signal of the magnetic pole position sensor 2, i.e. the amount of deviation of the magnetic pole position as viewed from the output side of the magnetic pole position sensor 2, is ordinarily detected manually or automatically, before the synchronous motor 1 is operated for the first time, and is stored in a memory, whereupon this amount of deviation is corrected according to a control computation algorithm.

For example, the invention disclosed in Japanese Patent Application Publication No. H11-252972 (for instance, paragraphs [0006], [0007], FIG. 2) is a known instance of a technology that involves detecting the amount of deviation of a magnetic pole position in accordance with a so-called current draw-in scheme, and operating a permanent magnet-type synchronous motor, during normal operation, using a magnetic pole position corrected by the amount of deviation. FIG. 7 is a flowchart illustrating the magnetic pole position detection method described in this patent application publication.

In FIG. 7, firstly, a magnetic pole position (phase) $θ_0$ is virtually set to 0°, and DC current (d-axis current $I_d$) is caused to flow, in the d-axial direction, through armature windings of the permanent magnet-type synchronous motor (step S1). Rotation torque is generated thereupon, since the direction of the magnetic flux by the d-axis current $I_d$ and the direction of the magnetic flux by the rotor do not match each other in a case where the actual magnetic pole position of the rotor (permanent magnet) does not coincide with 0°. This rotation torque gives rise to rotation until the rotor matches the direction of the magnetic flux by the d-axis current $I_d$. The magnetic poles of the rotor are drawn as a result to the d-axis current $I_d$. This drawing ends once the magnetic pole position of the rotor match each other ultimately in the virtual d-axis (Yes in step S2). The magnetic pole position of the rotor reaches 0° at this point in time, and a counter value $N_1$ of the magnetic pole position sensor (encoder) at this time is read (step S3).

Next, the rotor is rotated (step S4), and a rotation angle from the virtual d-axis until detection of an origin pulse of the encoder is detected as a counter value $N_2$ (Yes in step S5, step S6). A difference $N_{dif}$ between the counter value $N_2$ at this time and the counter value $N_1$ is worked out. This difference $N_{dif}$ constitutes a value corresponding to the amount of deviation between the origin of the output signal of the encoder and the origin of the magnetic pole position of the rotor (step S7). Next, the difference $N_{dif}$ is converted to a phase difference in electrical angle, and $N_{dif}$ is multiplied by a conversion coefficient K, to work out a phase difference $\theta_{dif}$ (step S8). This phase difference $\theta_{dif}$ is stored in a memory, such that, every time that the origin pulse of the encoder is detected during normal operation of the permanent magnet-type synchronous motor, magnetic pole alignment is performed by adding the phase difference $\theta_{dif}$ to a detected magnetic pole position $\theta_0$, and the true magnetic pole position $\theta$, corrected by the amount of deviation, is worked out, to be used in vector control (step S9).

SUMMARY

The basic equation of the current of a permanent magnet-type synchronous motor (hereafter also referred to as synchronous motor, for short) is given by Eq. 1.

$$\begin{cases} I_d = -I_a \sin\beta \\ I_q = I_a \cos\beta \end{cases} \quad [\text{Eq. 1}]$$

Herein, $I_d$: d-axis current
$I_q$: q-axis current
$I_a$: phase current (effective value) of the synchronous motor
$\beta$: current phase angle
The output torque of the synchronous motor is given by Eq. 2. Eq. 2 can be rewritten, using Eq. 1, to yield Eq. 3.

$$T = 3P_n\{\Psi_a I_q - (L_d - L_q)I_d I_q\} \quad [\text{Eq. 2}]$$

Herein, $P_n$: number of pole pairs of the synchronous motor
$\Psi_a$: effective value of armature interlinkage magnetic flux by permanent magnets, per phase
$L_d$: d-axis inductance of the synchronous motor
$L_q$: q-axis inductance of the synchronous motor $$T = 3P_n\left\{\Psi_a I_a \cos\beta + \frac{1}{2}(L_q - L_d)I_a^2 \sin 2\beta\right\} \quad [\text{Eq. 3}]$$

The output torque T in Eq. 3 is the sum ($T=T_m+T_r$) of magnet torque $T_m$ in Eq. 4 and reluctance torque $T_r$ in Eq. 5. The magnet torque $T_m$ arises from the attractive force or the repulsive force of the magnetic poles of the rotor and the rotating magnetic field by the armature windings, and the reluctance torque $T_r$ arises from the difference between the d-axis inductance and the q-axis inductance.

$$\begin{aligned} T_m &= 3P_n \Psi_a I_q \\ &= 3P_n \Psi_a I_a \cos\beta \end{aligned} \quad [\text{Eq. 4}]$$

$$\begin{aligned} T_r &= \frac{3}{2}P_n(L_d - L_q)I_d I_q \\ &= \frac{3}{2}P_n(L_q - L_d)I_a^2 \sin 2\beta \end{aligned} \quad [\text{Eq. 5}]$$

In a case where the phase currents of the synchronous motor are constant, the various torques T, $T_m$, $T_r$ depend on a current phase angle $\beta$ as illustrated in FIG. 3.

In the conventional technology of, for instance, Japanese Patent Application Publication No. H11-252972 described above, $I_q=0$ and $I_d>0$ in the case of a draw-in operation through flow of a predetermined DC current. As Eq. 1 indicates, the current phase angle $\beta$ is $-90°$ in such a case. Draw-in torque is generated, upon flow of the draw-in current, in a case where the magnetic poles of the rotor are at a position other than that where the current phase angle $\beta$ is $-90°$, whereas the draw-in torque becomes zero in a case where the magnetic poles of the rotor are at a position where the current phase angle $\beta$ is $-90°$. That is, the magnetic poles of the rotor are drawn to a position where the current phase angle $\beta$ is $-90°$, whereupon the rotor stops.

As described above, the output torque T of the synchronous motor is the sum of the magnet torque $T_m$ and the reluctance torque $T_r$. The magnet torque $T_m$ increases with increasing current phase angle $\beta$, whereas the reluctance torque $T_r$ decreases with increasing current phase angle $\beta$, in the vicinity of a current phase angle $\beta$ of $-90°$, as illustrated in FIG. 3. The magnitude of the output torque T varies, and the proportion of the magnet torque $T_m$ and the reluctance torque $T_r$ in the output torque T varies as well, depending on the magnitude of the draw-in current.

Accordingly, there exists a plurality of current phase angles at which the output torque T becomes zero, because the monotonically increasing relationship between the output torque T and the current phase angle $\beta$ is lost, in the vicinity of a current phase angle $\beta$ of $-90°$, depending on the specification and characteristics of the permanent magnet-type synchronous motor.

In such a case, the magnetic poles of the rotor are not ultimately drawn to a point $P_0$ at which the current phase angle is $-90°$, but to a point $P_1$ or point $P_2$ at which the output torque T becomes zero, before and after the point $P_0$, for instance as illustrated in FIG. 4. At these points $P_1$, $P_2$, the origin of the magnetic pole position of the rotor does not match the d-axial direction. Therefore, a large error with respect to the true magnetic pole position arises when magnetic pole alignment is performed on the basis of an amount of deviation worked out taking as a reference the counter value of the magnetic pole position sensor at this time.

Therefore, a goal to be attained by the present disclosure is to provide a magnetic pole position detection device of a permanent magnet-type synchronous motor that allows detecting a true magnetic pole position by performing accurate magnetic pole alignment.

In order to attain the above goal, an aspect of the present disclosure is a magnetic pole position detection device that detects an amount of deviation between an origin of a magnetic pole position of a permanent magnet that makes up a rotor of a permanent magnet-type synchronous motor, and an origin of an output signal of a magnetic pole position sensor, and that corrects the output signal of the magnetic pole position sensor on the basis of the amount of deviation, to thereby detect a true magnetic pole position.

A first aspect of the present disclosure includes a draw-in current computing unit that computes a phase current $I_a$ such as to satisfy $I_a < \Psi_a/(L_q - L_d)$, using an effective value $\Psi_a$ of armature interlinkage magnetic flux by the permanent magnet per phase of the motor, a d-axis inductance $L_d$ in a virtual magnetic flux axial direction and a q-axis inductance $L_q$ in a direction perpendicular to the magnetic flux axial direction, which are constituent components of the inductance of the motor; and an $I_d$ computing unit that computes the d-axis current from the phase current $I_a$. A current draw-in operation is performed by causing the d-axis current to flow through armature windings, to thereby draw the rotor to the magnetic flux axial direction.

A second aspect of the present disclosure includes a draw-in current computing unit that computes a phase current $I_a$ such as to satisfy $I_a=\Psi_a/(2(L_q-L_d))$, using the effective value $\Psi_a$, d-axis inductance $L_d$ and q-axis inductance $L_q$; and an $I_d$ computing unit that computes the d-axis current from the phase current $I_a$, wherein a current draw-in operation is performed by causing the d-axis current to flow through armature windings of the motor, to thereby draw the rotor to the magnetic flux axial direction.

A third aspect of the present disclosure includes a draw-in current computing unit that computes a phase current $I_a$ such as to satisfy $I_a=\Psi_a/(2(L_q-L_d))$, using the effective value $\Psi_a$, d-axis inductance $L_d$ and q-axis inductance $L_q$; and an $I_d$ computing unit that computes a d-axis current in the magnetic flux axial direction on the basis of the smallest current value among a maximum current allowed by an armature of the motor, a maximum current allowed by an inverter for causing current to flow through armature windings of the motor, and the phase current $I_a$, wherein a current draw-in operation is performed by causing the d-axis current to flow through the armature windings, to thereby draw the rotor to the magnetic flux axial direction.

A fourth aspect of the present disclosure includes a draw-in current computing unit that sets $\Psi_a/(L_q-L_d)$ as a maximum current value, and that computes a phase current $I_a$ that varies within a range extending from the maximum current value to a predetermined minimum current value; and an $I_d$ computing unit that computes the d-axis current from the phase current $I_a$. The current draw-in operation is performed by causing the d-axis current to flow through armature windings, to thereby draw the rotor to a position at which a grade of torque of the rotor with respect to a phase angle of the phase current $I_a$ is maximum.

A fifth aspect of the present disclosure includes a draw-in current computing unit that sets $\Psi_a/(L_q-L_d)$ as a maximum current value, and that computes a phase current $I_a$ that varies within a range extending from the maximum current value to a predetermined minimum current value; and an $I_d$ computing unit that computes a d-axis current in the magnetic flux axial direction on the basis of the smallest current value among a maximum current allowed by an armature of the motor, a maximum current allowed by an inverter for causing current to flow through armature windings of the motor, and the phase current $I_a$, wherein the current draw-in operation is performed by causing the d-axis current to flow through the armature windings, to thereby draw the rotor to a position at which a grade of torque of the rotor with respect to a phase angle of the phase current $I_a$ is maximum.

By properly setting of the magnitude of draw-in current, the present disclosure allows magnetic pole alignment to be carried out through accurate drawing of the magnetic poles of the rotor in the d-axial direction, so that the true magnetic pole position can be detected with high precision as a result.

BRIEF DESCRIPTION OF THE DRAWINGS

These and/or other aspects and advantages will become apparent and more readily appreciated from the following description of the embodiments, taken in conjunction with the accompanying drawings of which:

FIG. 7 is a flowchart illustrating a magnetic pole position detection method described in Japanese Patent Application Publication No. H11-252972.

DESCRIPTION OF EMBODIMENTS

A first embodiment of the present disclosure will be explained next with reference to accompanying drawings.

Figure 4:
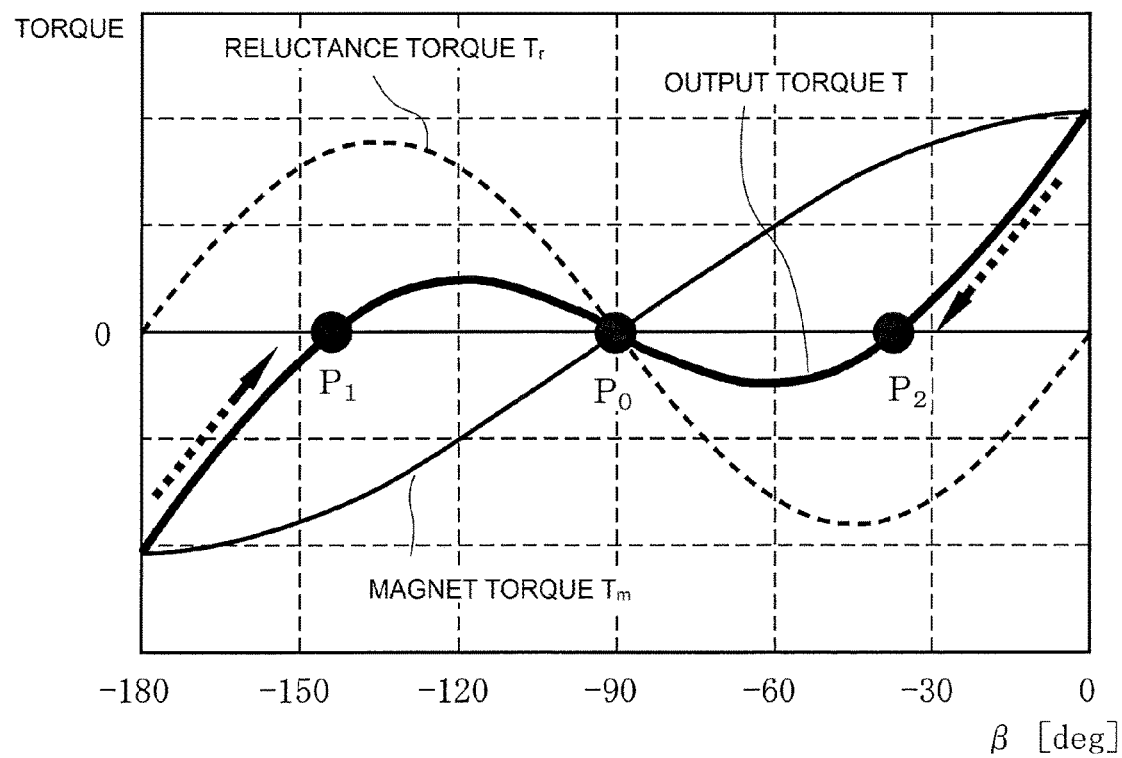
FIG. 4 is an explanatory drawing illustrating the relationship between current phase angle and output torque in a permanent magnet-type synchronous motor.

As described above, the magnetic poles of the rotor of the permanent magnet-type synchronous motor are drawn to point $P_0$ where the current phase angle $\beta$ is $-90°$ in FIG. 4, and, accordingly, the output torque T must be a monotonically increasing function of the current phase angle $\beta$ in the vicinity of $\beta=-90°$. The conditions for the output torque T to be a monotonically increasing function of the current phase angle $\beta$ in the vicinity of $\beta=-90°$ are as follows.

Firstly, the equation of output torque T in Eq. 3 is partially differentiated by the current phase angle $\beta$, at $\beta=-90°$, to yield Eq. 6 below.

$$\left.\frac{\partial T}{\partial \beta}\right|_{\beta=-90} = 3P_n\{\Psi_a I_a - (L_q - L_d)I_a^2\} \qquad \text{[Eq. 6]}$$

The condition in order for the output torque T to be a monotonically increasing function of the current phase angle $\beta$ is that Eq. 6 takes on a positive value, as given by Eq. 7. And Eq. 8 is derived from Eq. 7.

$$3P_n\{\Psi_a I_a - (L_q - L_d)I_a^2\} > 0 \qquad \text{[Eq. 7]}$$

$$I_a < \frac{\Psi_a}{L_q - L_d} \qquad \text{[Eq. 8]}$$

In the first embodiment, a draw-in current $I_a$ such as to satisfy the condition of Eq. 8 is caused to flow through the armature windings of the permanent magnet-type synchronous motor, to draw in as a result the magnetic poles of the rotor. In consequence, there is no longer a plurality of points at which the output torque T becomes zero, as illustrated in FIG. 4, in the vicinity of a current phase angle $\beta$ of $-90°$, and the magnetic poles of the rotor are drawn to a position at which the current phase angle is $-90°$. Therefore, the rotor stops in a state where the magnetic poles of the rotor match in the d-axial direction.

In consequence, it becomes possible to detect the actual amount of deviation of the magnetic pole position in accordance with, for instance, a method identical to those in conventional art, and the true magnetic pole position θ can be detected by performing magnetic pole alignment by correcting the magnetic pole position, detected by the magnetic pole position sensor 2, by the amount of deviation, during normal operation of the synchronous motor.

Depending on the motor, $L_q-L_d$ is small, and the $I_a$ that satisfies Eq. 8 conceivably exceeds a maximum allowable current of the motor or a maximum output current of an inverter, but in practice it suffices to limit $I_a$ to the maximum allowable current of the motor and the inverter maximum output current.

A second embodiment of the present disclosure will be explained next. In some instances, torque must be generated in order to draw the magnetic pole position of the rotor to a position where the current phase angle β is −90°. At the −90° position, however, the drawing torque becomes zero. In a strict sense, therefore, the magnetic pole position of the rotor stops in the vicinity of a position where the current phase angle β is −90°, and an error arises in the magnetic pole alignment. The extent of this error varies depending on external friction torque, cogging torque and the magnitude of the draw-in current. The above error can however be reduced by optimizing the magnitude of the draw-in current.

In order to reduce the error in magnetic pole alignment, it suffices that the variation amount of output torque T with respect to the variation amount of the current phase angle β be maximal, in other words, it suffices that the partial derivative value in Eq. 6 be a maximum. That is, it suffices to work out a phase current $I_a$ for which Eq. 6 is maximum, and to set that phase current $I_a$ as the draw-in current.

Herein, Eq. 9 is obtained when the value resulting from partial differentiation of Eq. 6 by $I_a$ is 0.

$$\frac{\partial}{\partial I_a}\left(\frac{\partial T}{\partial \beta}\bigg|_{\beta=-90}\right) = 0 \quad [\text{Eq. 9}]$$

$$\frac{\partial}{\partial I_a}[3P_n\{\Psi_a I_a - (L_q - L_d)I_a^2\}] = 0$$

$$3P_n\{\Psi_a - 2(L_q - L_d)I_a\} = 0$$

Accordingly, the optimal phase current $I_a$ is given by Eq. 10.

$$I_a = \frac{\Psi_a}{2(L_q - L_d)} \quad [\text{Eq. 10}]$$

Figure 5:
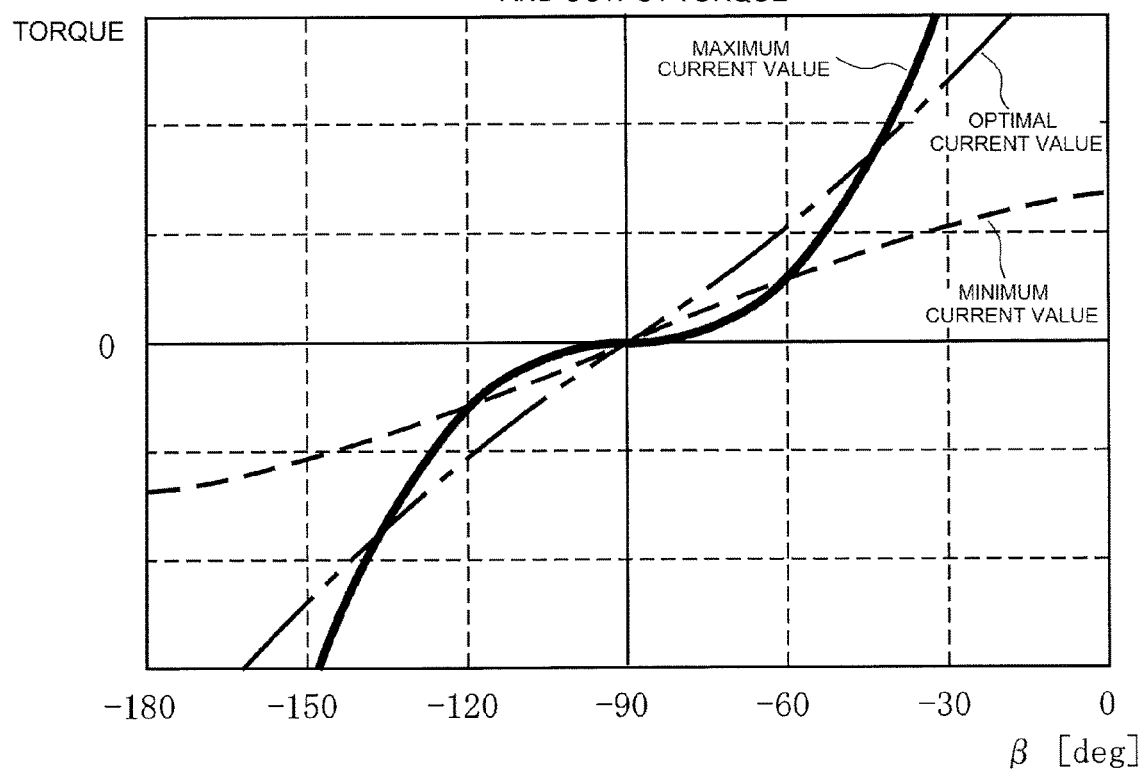
FIG. 5 is a diagram illustrating the relationship between current phase angle and output torque for a maximum current value, an optimal current value and a minimum current value.

FIG. 5 illustrates a relationship between a maximum value (maximum current value) of $I_a$ as calculated using Eq. 8, an optimal current value as calculated using Eq. 10 and the output torque T of the current phase angle β, for a predetermined minimum current value.

As FIG. 5 illustrates, the grade of an output torque curve is largest at a position where the current phase angle β is −90°, for the optimal current value calculated using Eq. 10. That is, the variation amount of output torque with respect to the variation amount of current phase angle, in the vicinity of β=−90°, is large, and the error in the magnetic pole alignment becomes minimal as a result. Accordingly, the rotor is preferably drawn using the optimal current value $I_a$ of Eq. 10.

Depending on the motor, $L_q-L_d$ is small, and the $I_a$ that satisfies Eq. 10 conceivably exceeds a maximum allowable current of the motor or the maximum output current of the inverter, but in practice it suffices to limit $I_a$ to the maximum allowable current of the motor and the inverter maximum output current.

A third embodiment of the present disclosure will be explained next. The second embodiment described above allows calculating an optimal current value that reduces the error in magnetic pole alignment. Ordinarily, however, it is difficult to measure accurately $\Psi_a$, $L_d$, $L_q$, which are various parameters of the permanent magnet-type synchronous motor of interest, and a concern of change in the various parameters arises due to occurrence of magnetic saturation inside the synchronous motor when draw-in current flows through the armature windings. Accordingly, it is difficult to calculate accurately the optimal current value by computing Eq. 10.

In the third embodiment, therefore, the magnitude of draw-in current is automatically modified little by little (increased or reduced) within a range from a predetermined minimum current value up to the maximum current value by Eq. 8 (i.e. $\Psi_a/(L_q-L_d)$), such that the magnetic pole position can be drawn ultimately to a position closest to the position where the current phase angle β is −90°, by determining the draw-in current using a current value at the point in time where the variation amount of the output torque with respect to the variation amount of the current phase angle is largest.

Figure 1:
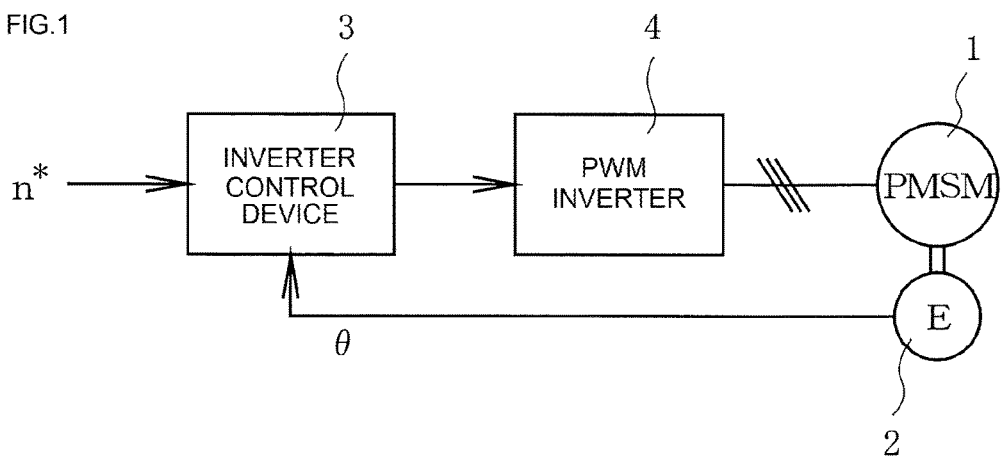
FIG. 1 is a configuration diagram of a driving system of a permanent magnet-type synchronous motor in which an embodiment of the present disclosure and conventional art are utilized.
Figure 2:
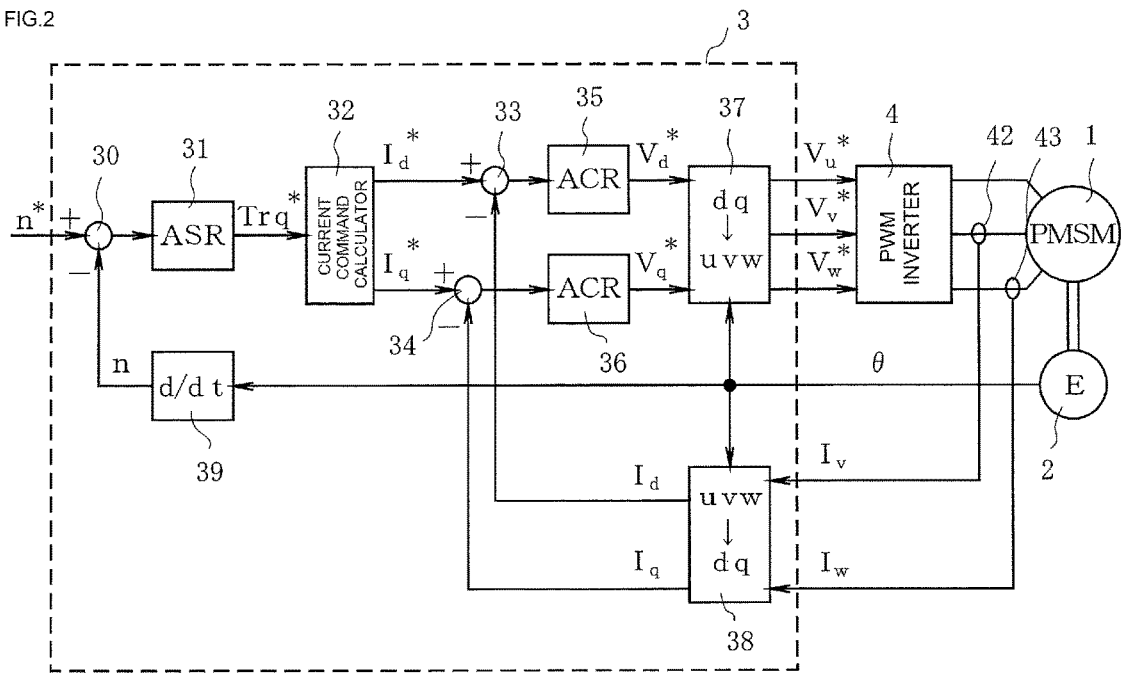
FIG. 2 is a block diagram illustrating the configuration of an inverter control device of FIG. 1.
Figure 3:
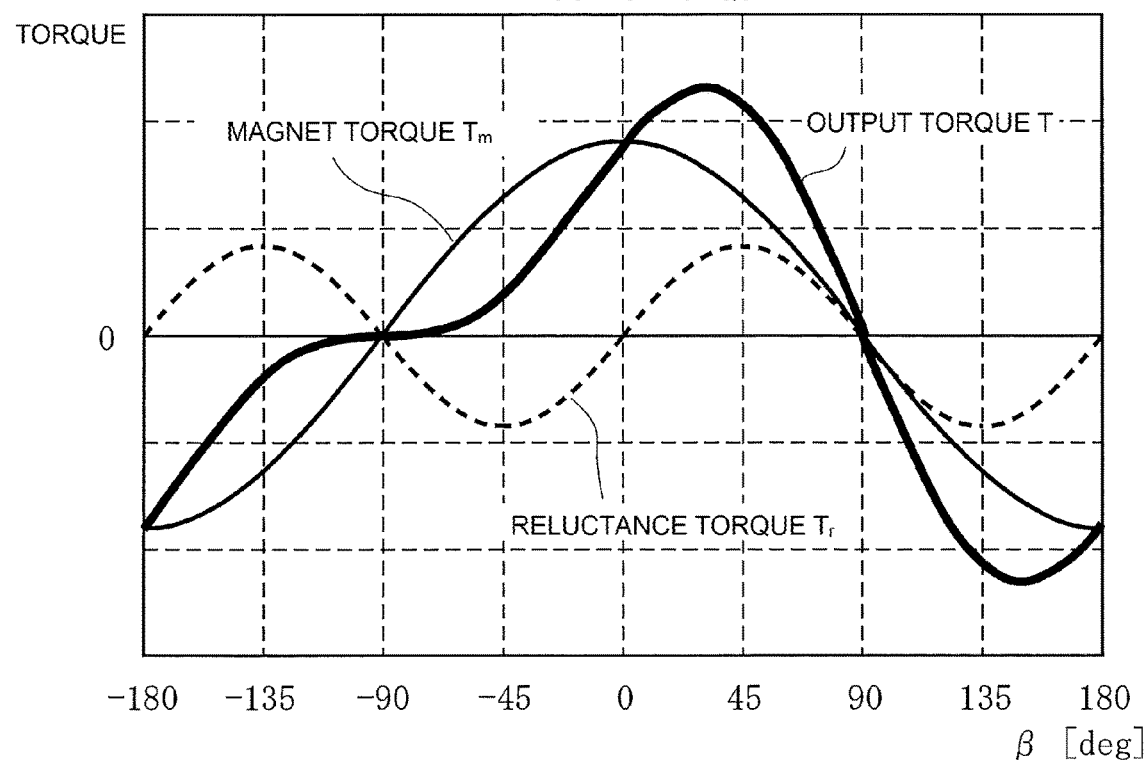
FIG. 3 is an explanatory drawing illustrating the relationship between current phase angle and output torque in a permanent magnet-type synchronous motor.
Figure 6:
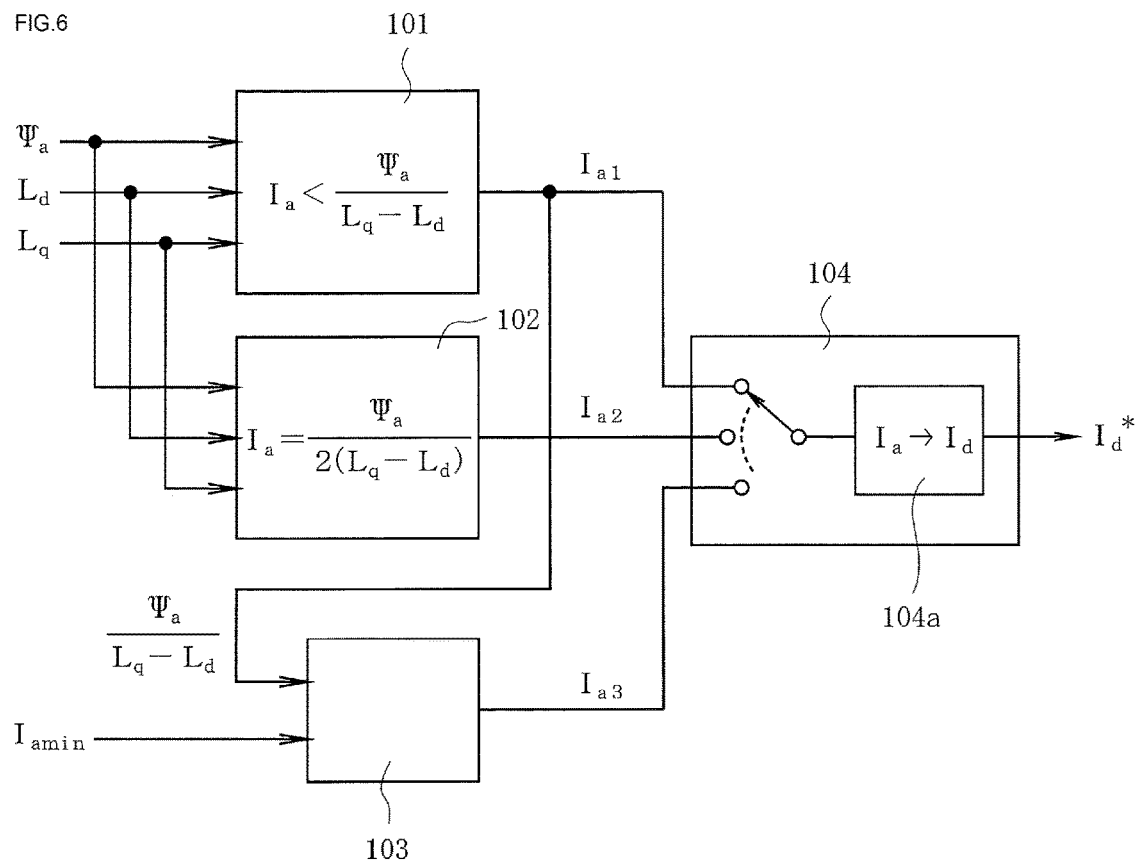
FIG. 6 is a functional block diagram illustrating conceptually the effect of the various embodiments of the present disclosure.

FIG. 6 is a functional block diagram illustrating conceptually the working of the various embodiments of the present disclosure, and which is implemented, for instance, through execution of a predetermined program by the inverter control device 3 of FIG. 1.

In FIG. 6, a draw-in current computing unit 101 works out a draw-in current $I_{a1}$ smaller than $\Psi_a/(L_q-L_d)$, on the basis of Eq. 8 in the first embodiment, using $\Psi_a$, $L_d$ and $L_q$. A draw-in current computing unit 102 works out a draw-in current $I_{a2}(=\Psi_a/(2(L_q-L_d)))$, as an optimal current value, on the basis of Eq. 10 of the second embodiment, using $\Psi_a$, $L_d$ and $L_q$. Further, a draw-in current computing unit 103 sets $\Psi_a/(L_q-L_d)$ as a maximum value, as explained in the third embodiment, and modifies the magnitude of the draw-in current within a range in which $I_{amin}$ is set to a minimum current value, and determines, as a draw-in current $I_{a3}$, the current value for which the grade of the output torque T with respect to the current phase angle β is largest.

In the draw-in current selection unit 104 there is selected any one of the above draw-in currents $I_{a1}$, $I_{a2}$, $I_{a3}$, and an $I_d$ computing unit 104a works out the d-axis current on the basis of Eq. 1 above, from among the selected draw-in current $I_a$ (any one of $I_{a1}$, $I_{a2}$ and $I_{a3}$) and controls a semiconductor switching element of the inverter 4 in such a manner that a d-axis current according to the command value $I_d^*$ flows in the armature windings. The configuration illustrated in FIG. 6 allows performing a current draw-in operation by causing a d-axis current, according to a desired embodiment, to flow through the armature windings. Depending on the motor, $L_q-L_d$ is small, and the $I_a$ conceivably exceeds a maximum allowable current of the motor, or a maximum output current of the inverter. In practice, however, it suffices to limit the $I_a$ to the maximum allowable current of the motor and the inverter maximum output current.

In the various embodiments, instances have been explained in which a draw-in current is caused to flow, with the virtual d-axis fixed, but for the present disclosure, other embodiments can be used also in instances where the draw-in current is caused to flow in a state where the d-axis is rotated at a constant speed, or in some other current draw-in scheme.

In embodiments according to the present disclosure, including those discussed above, all units or components that perform calculation, computing and/or data processing functionalities (such as the draw-in current computing units 101, 102, 103, the $I_d$ computing unit 104a, and the draw-in current selection unit 104), may be implemented in the form of at least one hardware processor configured to carry out these functionalities. That is, the performance of any one or more of the functionalities may be accomplished by a single hardware processor, or be divided, in any manner known to those skilled in the art, among multiple hardware processors.

Reference signs and numerals are as follows:
1: permanent magnet-type synchronous motor
2: magnetic pole position sensor
3: inverter control device
30, 35, 36: current regulator
31: speed regulator
32: current command calculator
33, 34: subtractor
37, 38: coordinate converter
39: differential calculator
4: PWM inverter
42, 43: current detector
101, 102, 103: draw-in current computing unit
104: draw-in current selection unit
104a: $I_d$ computing unit Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A control device to control an inverter operating a permanent magnet-type synchronous motor including a rotor having a permanent magnet, and to detect a magnetic pole position of the permanent magnet by controlling the inverter to perform a current draw-in operation of the motor, the control device comprising:
   an output to output a drive signal that drives the inverter;
   an input to receive an output signal of a magnetic pole position sensor coupled to the motor; and
   at least one hardware processor configured to
      compute a phase current $I_a$ satisfying $I_a < \Psi_a/(L_q - L_d)$, using an effective value $\Psi_a$ of armature interlinkage magnetic flux by the permanent magnet per phase of the motor, a d-axis inductance $L_d$ in a virtual magnetic flux axial direction and a q-axis inductance $L_q$ in a direction perpendicular to the magnetic flux axial direction, which are constituent components of the inductance of the motor, such that when the motor is operated in accordance with the computed phase current $I_a$, an output torque generated by the motor is a monotonically increasing function of a phase angle β of the phase current $I_a$ in a vicinity of β=−90°,
      compute a d-axis current in the magnetic flux axial direction based on the computed phase current $I_a$,
      control the inverter, by controlling output of the drive signal, to perform the current draw-in operation of the motor so as to thereby cause the computed d-axis current to flow through armature windings of the motor, to thereby draw the rotor to the magnetic flux axial direction so that magnetic poles of the rotor are drawn to a position at which the phase angle β is −90°, and
      detect, through the current draw-in operation of the motor, an amount of deviation between an origin of the magnetic pole position of the permanent magnet and an origin of the output signal of the magnetic pole position sensor, and correct the output signal of the magnetic pole position sensor based on the amount of deviation, to thereby detect a true position of the magnetic pole position.

2. A control device to control an inverter operating a permanent magnet-type synchronous motor including a rotor having a permanent magnet, and to detect a magnetic pole position of the permanent magnet by controlling the inverter to perform a current draw-in operation of the motor, the control device comprising:
   an output to output a drive signal that drives the inverter;
   an input to receive an output signal of a magnetic pole position sensor coupled to the motor; and
   at least one hardware processor configured to
      compute a phase current $I_a$ satisfying $I_a = \Psi_a/(2(L_q - L_d))$, using an effective value $\Psi_a$ of armature interlinkage magnetic flux by the permanent magnet per phase of the motor, a d-axis inductance $L_d$ in a virtual magnetic flux axial direction and a q-axis inductance $L_q$ in a direction perpendicular to the magnetic flux axial direction, which are constituent components of the inductance of the motor, such that when the motor is operated in accordance with the computed phase current $I_a$, an output torque generated by the motor is a monotonically increasing function of a phase angle β of the phase current $I_a$ in a vicinity of β=−90°,
      compute a d-axis current in the magnetic flux axial direction based on the computed phase current $I_a$,
      control the inverter, by controlling output of the drive signal, to perform the current draw-in operation of the motor so as to thereby cause the computed d-axis current to flow through armature windings of the motor, to thereby draw the rotor to the magnetic flux axial direction so that magnetic poles of the rotor are drawn to a position at which the phase angle β is −90°, and
      detect, through the current draw-in operation of the motor, an amount of deviation between an origin of the magnetic pole position of the permanent magnet and an origin of the output signal of the magnetic pole position sensor, and correct the output signal of the magnetic pole position sensor based on the amount of deviation, to thereby detect a true position of the magnetic pole position.

3. The control device according to claim 2, wherein the at least one hardware processor is configured to compute the d-axis current in the magnetic flux axial direction based on the smallest current value among a maximum current allowed by an armature of the motor, a maximum current allowed by an inverter for causing current to flow through the armature windings of the motor, as well as the phase current $I_a$.

4. A control device to control an inverter operating a permanent magnet-type synchronous motor including a rotor having a permanent magnet, and to detect a magnetic pole position of the permanent magnet by controlling the inverter to perform a current draw-in operation of the motor, the control device comprising:
   an output to output a drive signal that drives the inverter;

an input to receive an output signal of a magnetic pole position sensor coupled to the motor; and at least one hardware processor configured to set, as a maximum current value, $\Psi_a/(L_q-L_d)$ that is computed using an effective value $\Psi_a$ of armature interlinkage magnetic flux by the permanent magnet per phase of the motor, a d-axis inductance $L_d$ in a virtual magnetic flux axial direction and a q-axis inductance $L_q$ in a direction perpendicular to the magnetic flux axial direction, which are constituent components of the inductance of the motor, and to compute a phase current $I_a$ that varies within a range extending from the maximum current value to a predetermined minimum current value, such that when the motor is operated in accordance with the computed phase current $I_a$, an output torque generated by the motor is a monotonically increasing function of a phase angle β of the phase current $I_a$ in a vicinity of β=−90°, and compute a d-axis current in the magnetic flux axial direction based on the phase current $I_a$, control the inverter, by controlling output of the drive signal, to perform the current draw-in operation of the motor so as to thereby cause the d-axis current to flow through armature windings, to thereby draw the rotor to a position at which a grade of torque of the rotor with respect to a phase angle of the phase current $I_a$ is maximum and at which the phase angle β is −90°, and detect, through the current draw-in operation of the motor, an amount of deviation between an origin of the magnetic pole position of the permanent magnet and an origin of the output signal of the magnetic pole position sensor, and correct the output signal of the magnetic pole position sensor based on the amount of deviation, to thereby detect a true position of the magnetic pole position.

5. The control device according to claim 4, wherein
the at least one hardware processor is configured to compute the d-axis current in the magnetic flux axial direction based on of the smallest current value among a maximum current allowed by an armature of the motor, a maximum current allowed by an inverter for causing current to flow through armature windings of the motor, as well as the phase current $I_a$.

6. The control device according to claim 1, wherein
the phase current $I_a$ is a first phase current $I_{a1}$,
the at least one hardware processor is further configured to compute, using the $\Psi_a$, the $L_d$, and the $L_q$,
a second phase current $I_{a2}$, computed to satisfy $I_{a2}=\Psi_a/(2(L_q-L_d))$, and
a third phase current $I_{a3}$, computed to be within a range from a predetermined minimum current value to a maximum current value, the maximum current value computed by the at least one draw-in current computer to satisfy $\Psi_a/(L_q-L_d)$, and
the at least one hardware processor is further configured to
select a phase current from among the first phase current $I_{a1}$, the second phase current $I_{a2}$, and the third phase current $I_{a3}$, and
compute the d-axis current in the magnetic flux axial direction based on the selected phase current.

* * * * *